(12) United States Patent
Waterman

(10) Patent No.: US 11,895,376 B2
(45) Date of Patent: *Feb. 6, 2024

(54) SYSTEMS AND METHODS FOR CREATING CUSTOMIZED CONTENT

(71) Applicant: Rovi Guides, Inc., San Jose, CA (US)

(72) Inventor: Alan Waterman, Merced, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,728

(22) Filed: Jun. 25, 2021

(65) Prior Publication Data
US 2021/0377629 A1 Dec. 2, 2021

Related U.S. Application Data

(63) Continuation of application No. 16/363,919, filed on Mar. 25, 2019, now Pat. No. 11,082,757.

(51) Int. Cl.
| | |
|---|---|
| *H04N 21/8543* | (2011.01) |
| *G06F 16/783* | (2019.01) |
| *G06T 15/50* | (2011.01) |
| *H04N 21/44* | (2011.01) |

(52) U.S. Cl.
CPC ..... *H04N 21/8543* (2013.01); *G06F 16/7847* (2019.01); *G06T 15/50* (2013.01); *H04N 21/44004* (2013.01)

(58) Field of Classification Search
None
See application file for complete search history.

(56) References Cited

U.S. PATENT DOCUMENTS

| | | | |
|---|---|---|---|
| 6,100,881 A | 8/2000 | Gibbons et al. | |
| 6,289,165 B1 * | 9/2001 | Abecassis | H04N 7/141 348/E7.071 |
| 7,756,945 B1 | 7/2010 | Andreessen et al. | |
| 8,578,416 B1 | 11/2013 | Radloff et al. | |
| 8,937,620 B1 | 1/2015 | Teller | |

(Continued)

FOREIGN PATENT DOCUMENTS

| | | |
|---|---|---|
| CN | 106530227 A | 3/2017 |
| JP | 2005522108 A | 7/2005 |
| JP | 2008539479 A | 11/2008 |

OTHER PUBLICATIONS

PCT International Search Report and Written Opinion for International Application No. PCT/US2020/020075, dated Jun. 22, 2020 (14 pages).

(Continued)

*Primary Examiner* — Heather R Jones
(74) *Attorney, Agent, or Firm* — Haley Guiliano LLP

(57) ABSTRACT

Systems and methods are disclosed for generating a content structure that can then be used as a content design building block. Specifically, new content can be automatically generated by combining, replacing or mixing and matching objects, actions, settings, effects, audio, etc., from any number of previously stored content structures to create a new content structure, which is then rendered as a new content segment. Content segments are then stitched together to generate a finished content stream. In this way, new and original content can be created without the traditionally expensive and labor-intensive filming or computer animation processes.

20 Claims, 17 Drawing Sheets

(56) References Cited

U.S. PATENT DOCUMENTS

| | | |
|---|---|---|
| 9,106,812 B1 | 8/2015 | Price et al. |
| 9,671,940 B1 | 6/2017 | Malik et al. |
| 10,074,200 B1 | 9/2018 | Yeturu |
| 10,665,030 B1 | 5/2020 | Shekhar et al. |
| 10,685,059 B2 | 6/2020 | Kim et al. |
| 11,256,863 B2 | 2/2022 | Ahamed et al. |
| 11,562,016 B2 | 1/2023 | Saito et al. |
| 11,604,827 B2 | 3/2023 | Nasir et al. |
| 2003/0105750 A1 | 6/2003 | Chaboche |
| 2004/0004665 A1 | 1/2004 | Kashiwa |
| 2006/0194181 A1 | 8/2006 | Rosenberg |
| 2006/0230331 A1 | 10/2006 | Abanami et al. |
| 2007/0147654 A1 | 6/2007 | Clatworthy et al. |
| 2007/0296723 A1 | 12/2007 | Williams |
| 2007/0300157 A1 | 12/2007 | Clausi et al. |
| 2008/0055316 A1 | 3/2008 | Pahud et al. |
| 2008/0165194 A1 | 7/2008 | Uranaka et al. |
| 2009/0144609 A1 | 6/2009 | Liang et al. |
| 2009/0210395 A1 | 8/2009 | Sedam |
| 2009/0240727 A1 | 9/2009 | Sheehan |
| 2010/0050083 A1 | 2/2010 | Axen et al. |
| 2010/0150526 A1 | 6/2010 | Rose et al. |
| 2011/0106656 A1 | 5/2011 | Schieffelin |
| 2011/0239119 A1 | 9/2011 | Phillips et al. |
| 2011/0261030 A1 | 10/2011 | Bullock |
| 2012/0005616 A1 | 1/2012 | Walsh et al. |
| 2013/0080881 A1 | 3/2013 | Goodspeed et al. |
| 2014/0164593 A1 | 6/2014 | Murray et al. |
| 2014/0207778 A1 | 7/2014 | Raichelgauz et al. |
| 2015/0011298 A1 | 1/2015 | Haid et al. |
| 2015/0016714 A1 | 1/2015 | Chui |
| 2015/0154192 A1 | 6/2015 | Lysne et al. |
| 2015/0254497 A1 | 9/2015 | Jang et al. |
| 2015/0269441 A1 | 9/2015 | Mj |
| 2016/0110612 A1 | 4/2016 | Sabripour et al. |
| 2017/0011280 A1 | 1/2017 | Soldevila et al. |
| 2017/0025152 A1 | 1/2017 | Jaime et al. |
| 2017/0097969 A1 | 4/2017 | Stein et al. |
| 2017/0098152 A1 | 4/2017 | Kerr et al. |
| 2017/0300748 A1 | 10/2017 | Austin et al. |
| 2017/0315966 A1 | 11/2017 | Iyer et al. |
| 2018/0107638 A1 | 4/2018 | Ekambaram et al. |
| 2018/0176661 A1 | 6/2018 | Varndell et al. |
| 2018/0225380 A1 | 8/2018 | Netto et al. |
| 2018/0300361 A1 | 10/2018 | Ben-Aharon et al. |
| 2018/0300958 A1 | 10/2018 | Schriber et al. |
| 2018/0308523 A1 | 10/2018 | Silvestri et al. |
| 2018/0356967 A1 | 12/2018 | Rasheed |
| 2019/0107927 A1 | 4/2019 | Schriber et al. |
| 2019/0155955 A1 | 5/2019 | Castaneda et al. |
| 2019/0267041 A1 | 8/2019 | Ricciardi |
| 2019/0304157 A1 | 10/2019 | Amer et al. |
| 2019/0370984 A1 | 12/2019 | Tsai et al. |
| 2020/0019370 A1 | 1/2020 | Doggett et al. |
| 2020/0098283 A1 | 3/2020 | Vaculin et al. |
| 2020/0312368 A1 | 10/2020 | Waterman |
| 2020/0314508 A1 | 10/2020 | Waterman |
| 2020/0334246 A1 | 10/2020 | Chen et al. |
| 2020/0409990 A1 | 12/2020 | Saito et al. |
| 2021/0019368 A1 | 1/2021 | Ahamed et al. |
| 2021/0027427 A1 | 1/2021 | Waterman |
| 2021/0042258 A1 | 2/2021 | Hitchins |
| 2021/0117409 A1 | 4/2021 | O'Connor et al. |
| 2021/0263964 A1 | 8/2021 | Nasir et al. |
| 2021/0407044 A1 | 12/2021 | Waterman |
| 2022/0059134 A1 | 2/2022 | Waterman |
| 2022/0138415 A1 | 5/2022 | Ahamed et al. |
| 2023/0185848 A1 | 6/2023 | Nasir et al. |
| 2023/0229694 A1 | 7/2023 | Saito et al. |

OTHER PUBLICATIONS

PCT Search Report and Written Opinion in PCT/US2020/041121 dated Oct. 16, 2020.

Florescu, D., et al., ""Storing and Querying XML Data using an RDMBS"", "Quarterly Bulletin of the Computer Society of the IEEE Technical Committee on Data Engineering", Sep. 1, 1999, pp. 27-34.

Luebke, David, ""A Developer's Survey of Polygonal Simplification Algorithms"", "IEEE Computer Graphics and Applications", Aug. 7, 2002, pp. 24-35.

Po et al., ""Automatic 2D-to-3D video conversion technique based on depth-from-motion and color segmentation,"" IEEE10th International Conference, https://ieeexplore.ieee.org/abstract/document/5655850., Oct. 24-28, 2010, 4 pages.

Tsaftaris et al., "Colorizing a Masterpiece", IEEE Signal Processing Magazine, May 2011, 7 pages.

Turk, Greg, ""Re-Tiling Polygonal Surfaces"", "Computer Graphics and Interactive Techniques", Jul. 1, 1992, pp. 55-64.

U.S. Appl. No. 16/453,841, filed Jun. 26, 2019, Sakura Saito.
U.S. Appl. No. 16/517,322, filed Jul. 19, 2019, Shakir Sharfraz.
U.S. Appl. No. 16/522,332, filed Jul. 25, 2019, Alan Waterman.
U.S. Appl. No. 16/658,510, filed Oct. 21, 2019, Lance G. O'Connor.
U.S. Appl. No. 16/844,511, filed Apr. 9, 2020, Sahir Nasir.
U.S. Appl. No. 17/517,844, filed Nov. 3, 2021, Alan Waterman.

\* cited by examiner

100

200

Example effects neural network training model inputs:

"Water Splash" 710

"Blood Splatter" 720

Pseudo code

```
content_structure_ID = CS133
    attribute_table_ID = AT131
        object_data_structure_ID = ODS134
            description_structure_ID = DS135
                object_ID = 111
                    object_type = human
                        object_feature_0 = male
                        object_feature_1 = 40_years
                        object_feature_2 = blue_jeans
                        object_feature_3 = brown_wavy_hair
                        object_feature_4 = latino
                        object_feature_5 = 5'11"
                        ...
                        object_state_0 = determined
                        object_state_1 = running
                        object_state_2 = sliding
                        object_state_3 = flailing
                        object_state_4 = falling
                        object_state_5 = grimacing
                object_ID = 112
                    object_type = 1980_dodge_charger
                        object_feature_0 = orange
                        object_feature_1 = dusty
                        object_state_1 = driving
                object_ID 113
                    object_type = AR-15_rifle
                        object_state_0 = used
                object_ID=114
                    object_type = foot
                        object_feature_0 = army_boot
                        object_feature_1 = shiny_black
        action_structure_ID = AS136
            action_0 (111, 112, sliding_across)
            action_1 (111, 113, holding)
            ...
```

FIG. 9A

Pseudo code content_structure_ID = CS133
    mapping_ID = M132
        for (object_ID = 111, 00:00 – 00:11)
            object_state = [0, 00:00 – 00:02, 27], [1, 00:02 – 00:05, 35], [2, 00:05-00:07,99], [3, 00:05 – 00:08,35], [4, 00:07- 00:08, 78], [5, 00:08-00:11, 45]

absolute_location = [00:00 – 00:02,(11.34, 23.34, 23.87)], [00:02-00:07, (12.02, 21.23, 05.67)], [00:07-00:11, (12.10, 11.13, 05.45)]

relative_location = [112, 00:00 – 00:02, (2.7, 30°)], [113, 00:02-00:07, (12.7, 47°)], [114, 00:07-00:11, (11.13, 132°)]

absolute_motion = [00:00 – 00:02,($\vec{v}_1$)], [00:02-00:7, ($\vec{v}_2$)], [00:07-00:11, ($\vec{v}_3$)]

Relative_motion = [112, 00:00 – 00:02,($\vec{v}_4$)], [113, 00:02-00:7, ($\vec{v}_5$)], [113, 00:07-00:11, ($\vec{v}_6$)], [114, 00:08 – 00:11, $\overrightarrow{(v_7)}$]

for (object_ID = 112, 00:00 – 00:07)
            ...

FIG. 9B

SYSTEMS AND METHODS FOR CREATING CUSTOMIZED CONTENT

CROSS-REFERENCE TO RELATED APPLICATIONS

This application is a continuation application of U.S. patent application Ser. No. 16/363,919, filed Mar. 25, 2019. The disclosure of the application is hereby incorporated by reference herein in its entirety.

TECHNICAL FIELD

The present disclosure is directed to content analytics and creation, and more particularly to creating a content design structure that is used to create new content.

BACKGROUND

Existing content providers such as traditional broadcasting networks, production companies, and over-the-top service providers often produce new content such as movies or television shows through audio/video capture of sets, filming actors/actresses and/or models. A significant amount of time, expense and efforts are usually required in developing scripts, costumes and sets as well as casting, filming and post-production editing in the content creation process. In addition, some existing computer-based post-production tools are used to add or edit computer-generated content such as special visual effects to video content from filming. But these tools often require labor-intensive programming to define attributes, motion paths, and features for an added visual effect, which is subsequently rendered frame-by-frame to produce the visual effect.

SUMMARY

In view of this problem, systems and methods are disclosed for generating a content structure that can then be used as a content design building block. Specifically, new content can be automatically generated by combining, replacing or mixing and matching objects, actions, settings, effects, audio, etc., from any number of previously stored content structures to create a new content structure, which is then rendered as a new content segment. Content segments are then stitched together to generate a finished content stream. In this way, new and original content can be created without the traditionally expensive and labor-intensive filming or computer animation processes.

Specifically, a content deconstruction engine is configured to create a content structure by deconstructing a segment of a content asset into an attribute table of structural listing of data fields and corresponding mappings. The data fields correspond to attributes of objects, settings, effects, etc., that appeared in the segment of a content asset, and the mapping includes attribute values corresponding to each attribute. In this way, the content deconstruction engine stores segments of content assets in a deconstructed form as content structures having a table of attributes and mappings of attribute values mapped to the corresponding attributes. These deconstructed content structures provide knowledge of attributes such as features of different objects, movement and interaction patterns between the objects, and relationships between the objects that appear in the original content segments.

To deconstruct a segment of content and generate a content structure, the content deconstruction engine performs pattern recognition on the segment to identify objects such as characters, scenery, lighting, props, action, motion, special effects, audio tracks, and/or the like. For each identified object, the content deconstruction engine determines a plurality of attributes related to the object. For example, an object may be a human character in the content segment and attributes of the human character object may include the height, race, age, gender, hair color, eye color, body type, a facial pattern signature, a movement pattern, a relative location with other objects, an interaction with other objects, and/or the like. The attributes are stored in the attribute table as a listing of data field names in the content structure.

The content deconstruction engine maps attributes of the object to attribute values depicting the actual object that appeared in the content segment, and the corresponding sub-segment within the content segment during which a specific attribute value appears. The attribute value, a presence indicator including the associated start time and end time of the sub-segment during which the respective attribute value is present in the content segment, and the mapping relationship with the respective attribute are collectively, separately, or independently referred to herein as "mapping." The content deconstruction engine then creates and stores the generated content structure including the attribute table and the associated mapping at a content design database.

The content structure, together with many other previously created and stored content structures can then be used to create customized content. Specifically, a content construction engine is implemented to retrieve one or more previously stored content structures and combine, replace or mix-match objects, settings, effects, audios, etc., from these content structures to create a new content structure. For example, the content construction engine may map relevant attributes of a particular object in a first content structure to attribute values from the mapping in a second content structure. The content construction engine then creates a new content structure having the object structure relating to the particular object being populated with attribute values from the second content structure, e.g., a human object structure can be modified with physical appearance and movement patterns relating to a monster creature derived from the attribute values from the second content structure. In this way, customized new content can be created using the content structure as a framework and customized mapping to fill in the framework without the labor of re-casting, re-setting or re-filming.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 9A-B provide pseudo-code examples of content structure illustrated in FIGS. 4-5 and 6A-D, according to some embodiments described herein;

DETAILED DESCRIPTION

Figure 1:
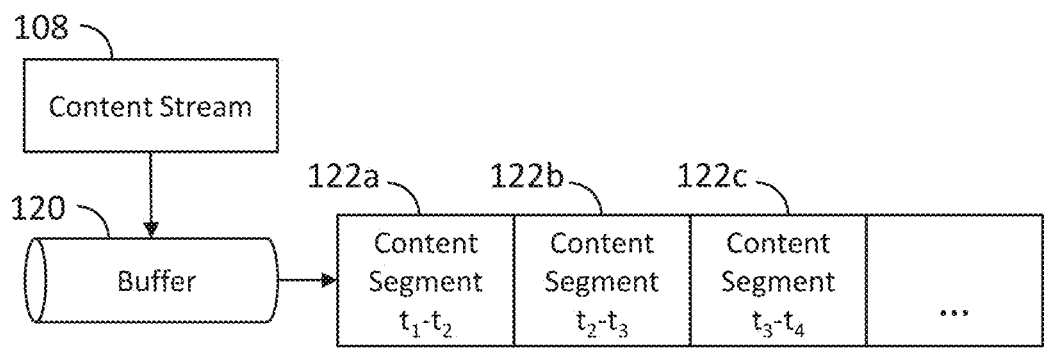
FIG. 1 depicts an example block diagram illustrating aspects of deconstructing a content asset into a number of content segments, according to some embodiments described herein.

FIG. 1 depicts an example block diagram illustrating aspects of deconstructing a content asset into a number of content segments, according to some embodiments described herein. Pre-processing system 100 includes a buffer 120, at which a content stream 108 is received and divided into a plurality of content segments 122a-c. For example, a content deconstruction engine (shown at 130 in FIG. 2) may be implemented to generate content segments 122a-c from the content stream 108. The content deconstruction engine may be implemented at a client station, a server, a set-top box, a game console, or any other hardware or software system or systems that can be configured to receive a content asset or a media stream and perform analytics on the content asset or media stream.

The content stream 108 may include, but is not limited to, professionally generated content, digital first content, a live broadcast, a previously stored content asset at a DVR, other broadcasted content, over-the-top (OTT) media stream, video and/or audio files, downloaded content, user-generated content or any media stream, and/or the like. The content deconstruction engine may "slice" the content stream 108 into a plurality of content segments 122a-c at the buffer 120. For example, the content deconstruction engine may determine a starting playback position and an ending playback position for each segment based, on a pre-determined segment duration, e.g., $[t_1, t_2]$, $[t_2, t_3]$, $[t_3, t_4]$, etc. The content segments 122a-c may have the same pre-defined duration lengths or may have different duration lengths. Example lengths for each content segment 122a-c may be pre-defined as 300 ms, 500 ms, 700 ms, and/or the like. Alternatively, the content segments 122a-c may also be defined by chapters, scenes, pauses in audio, close captions, etc., from the content stream 108.

Figure 2:
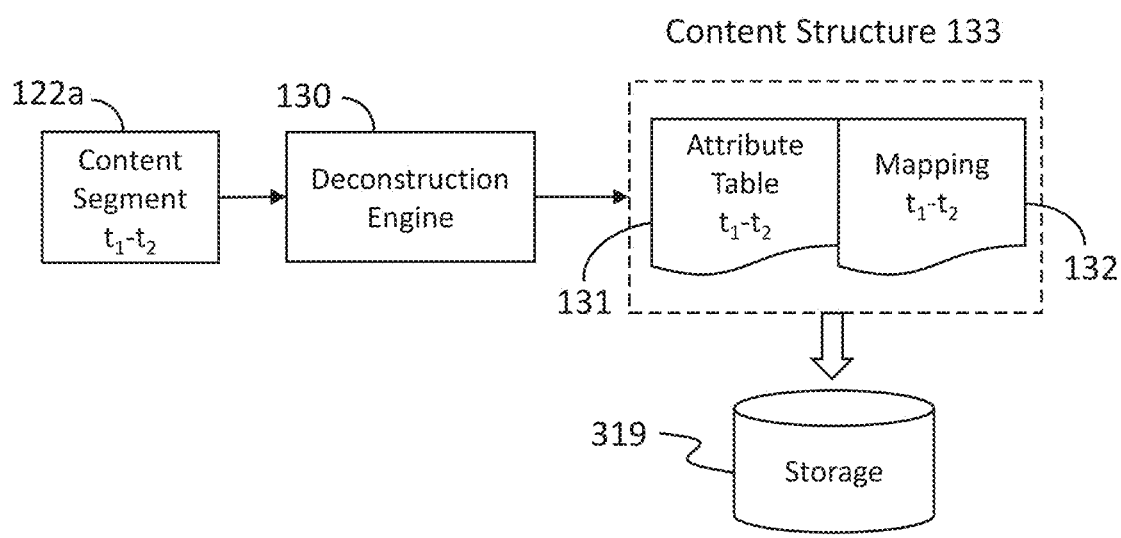
FIG. 2 provides an example block diagram illustrating a deconstruction system for generating a content structure associated with a content segment, according to embodiments described herein.

FIG. 2 provides an example block diagram illustrating a deconstruction system 200 for generating a content structure 133 associated with a content segment (122a as shown in FIG. 1), according to embodiments described herein. Specifically, the content deconstruction engine 130 receives a content segment, e.g., 122a from the pre-processing system 100 in FIG. 1, and may generate a content structure 133 corresponding to the content segment 122a. In some embodiments, the content structure 133 may be generated in real time while the streaming data relating to the content asset 108 is being received. In this case, streaming data from the content stream 108 is buffered at the buffer 120, and then the content deconstruction engine 130 progressively deconstructs each received content segment at the buffer 120 into a content structure 133, while the content stream 108 is also being received at the buffer.

For each determined content segment, e.g., 122a-c, the content deconstruction engine 130 may determine a content structure descriptive of objects and/or other features within the content segment. Specifically, the content deconstruction engine 130 may retrieve and analyze a content segment 122a (or can be any of 122a-c in FIG. 1), e.g., by pattern recognition on video frames contained in the content segment 122a to identify a number of objects, scenes, lighting, audio, etc. For each identified object, scene, lighting, audio, etc., the content deconstruction engine 130 determines a list of attributes for the attribute table 131 descriptive of the respective object, scene, lighting or audio, and corresponding mapping 132 including attribute values corresponding to the attributes.

For example, for a content segment 122a that features a male character and multiple non-human physical objects such as background settings, props, etc., the content deconstruction engine 130 may perform pattern recognition, based on an object database, to identify an object corresponding to the male character from the segment. Based on a type of the object, for example, when the object is a human object, the content deconstruction engine 130 identifies a list of attributes of each human object, including but not limited to gender, race, height, age, hair color, facial feature pattern, clothing style, status (e.g., static, moving, etc.), and other characteristics of the identified object. The content deconstruction engine further obtains specific attribute values, by content analysis of content segment 122a, corresponding to attributes, e.g., such as gender="male," race="Caucasian," height="6," age="28, hair color="brown," status="moving," etc. The attribute values are included in the mapping 132 associated with the attribute table 131.

The attribute table 131 and the associated mapping 132 are stored in the form of a content structure 133 at storage 319. Specifically, the content structure 133 can then be retrieved to create new content by combining with other deconstructed content structures, by replacing part of the mappings 132 with mappings stored in other content structures, or by any mix-matching with attributes or mappings from other content structures, as further described in FIGS. 13A-15. Content structure 133 may be stored as a structured data file compatible with XML, JSON, Python or in the form of other suitable computer readable file.

Storage device 319 may include any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. The content structure 133 including the attribute table 131 and mapping 132 may also be accessed at a cloud-based storage, which may be used to supplement a local storage device or instead of the storage device.

Figure 3A:
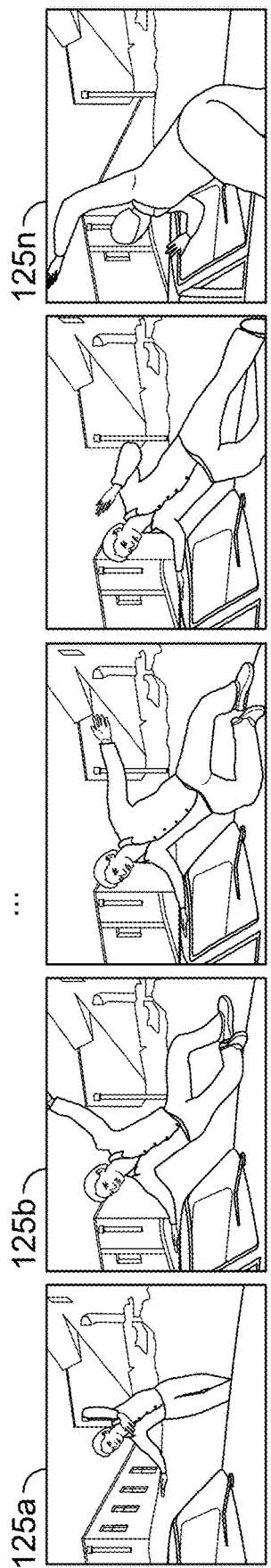
FIGS. 3A-3B provide illustrative diagrams illustrating that objects and the interaction among objects within an example content segment are analyzed frame by frame to generate the content structure, according to some embodiments described herein.
Figure 3B:
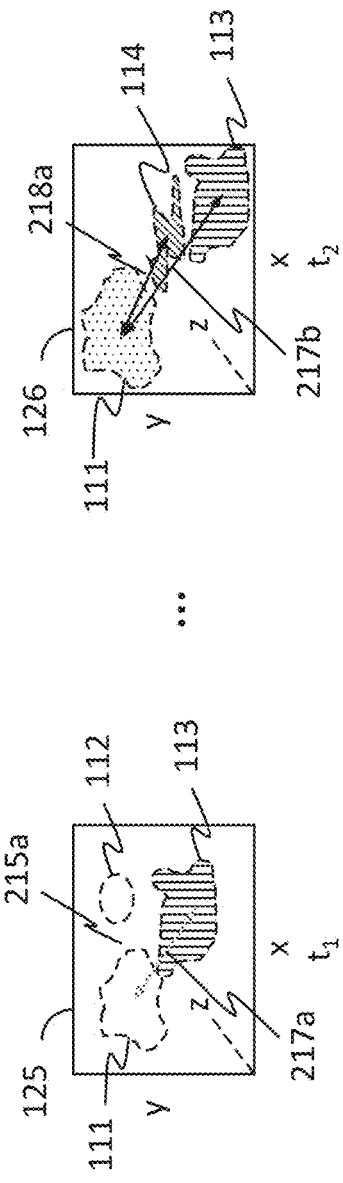

FIGS. 3A-3B provide diagrams illustrating that objects and the interaction among objects within an example content segment 122a are analyzed frame-by-frame to generate the content structure 133, according to some embodiments described herein. FIG. 3A illustrates a series of example consecutive video frames 125a-n deconstructed from content segment 122a, showing the process of a male character jumping over the front of a red car parked by a house. As shown in video frames 125a-n, the relative position between the male character and the red car and the relative position between the male character and the house are changing per frame. The content deconstruction engine 130 analyzes each object within each frame to generate attributes in the attribute table 131 and the associated mapping 132.

Specifically, as shown in FIG. 3B, frames 125 and 126 represent video frames in the content segment 122a at $t_1$ and $t_2$ within content segment 122a, respectively. Within each video frame, the content deconstruction engine 130 identifies various objects, e.g., objects 111, 112, 113 in video frame 125 and objects 111, 113, 114 in video frame 126. For each object, the content deconstruction engine determines a number of attributes such as the type (e.g., human, non-human object name, alien, monster, animation, etc.), state (e.g., new, old, whole, damaged, exploding, liquid, gas, solid) emotional, stoic, etc.), features (e.g., size, height, shape, color, hair color, race, age, gender, attire, etc.), the absolute location (e.g., X, Y and Z coordinates within a 2D or 3D video frame), the relative location (e.g., polar or spherical coordinates relative to another object, etc.), motion (e.g. velocity, movement direction, speed), action (e.g. driving, shooting, chasing, sitting, swimming, singing, etc.) audio (e.g., audio dialogue, background audio, audio volume, audio name, audio instrument type, etc.), and/or the like. Although video frame 125-126 only shows various objects for illustrative purposes, the content deconstruction engine 130 also identifies attributes for lighting (e.g. inside/outside, bright/dark, sunny/cloudy, candlelight/strobe light, season of year, etc.), set information (e.g. domicile, office, war zone, etc.), geographic location (e.g. underwater, space, jungle, mountains, cities, etc.), effects (explosions, smoke, etc.) and filters (e.g. sepia, airbrush, "old film", cartoon, etc.), etc. Additional example of attributes within the attribute table are shown in FIGS. 4 and 5A-D.

In some embodiments, an absolute location attribute (e.g., 136b) is included in the object structure for an object. For example, the content deconstruction engine determines the position point of object 111 as the coordinates (e.g., "$X_1, Y_1, Z_1$" $136b_1$ in mapping 132 for 3D content) of the respective center point of the object. The center point of each object can be obtained by locating the minimum rectangular shape covering the respective object. Deconstruction engine 130 continues to plot the absolute location of object 111 over the course of content segment 122a, as shown for example, in mapping 132 a different set of coordinates "$X_2, Y_2, Z_2$" $136b_2$ is shown when the location of object 111 changes over time.

The content deconstruction engine 130 further determines relative location attributes for objects. For example, as shown in FIG. 5A, object structure 134 includes the relative location attribute 136c for object 112, 113, 114 relative to object 111. The content deconstruction engine may compute a respective set of polar coordinates of the respective position relative to object 111 to describe a respective relative location relationship, e.g., shown at 215a, 217a in frame 125, or 217b and 218a in frame 126. For example, the relative position between the objects 111 and 112 can be described by a vector 215a between the respective center points of the objects 111 and 112, which can be described by polar (2D) or spherical (3D) coordinates $(L_1, \theta_1)$ or $(r, \theta, \gamma)$ respectively indicative of the vector 215a representing the relationship between the two objects. $L_1$ denotes a relative distance between objects 111 and 112, and $\theta_1$ denotes an angle of the vector from a horizontal axis of the video frame.

The object data structure for object 111 further includes a motion attribute 136e. The content deconstruction engine 130 computes a velocity vector $\vec{V_1}$ $136e_1$ based on the absolute location change $(X_2-X_1, Y_2-Y_1, Z_2-Z_1)$ and a time lapse between the video frames, to represent the attribute value corresponding to the motion attribute for object 111. The velocity vector may change with time, which is indicated in the mapping 132 shown in FIG. 4, as a time-varying vector.

In some embodiments, the content deconstruction engine determines a motion of the object by monitoring the relative position change between objects. The content deconstruction engine may retrieve a second video frame (e.g., video frame 126) corresponding to a playback position that is later than the first video frame (e.g., video frame 125), and re-computes a second set of polar coordinates to describe a respective relative location relationship. For example, the content deconstruction engine may compute the relative position between object 111 and object 112 at $t_2$, e.g., described by polar coordinates $(L_2, \theta_2)$ indicative of line segment $215_b$ connecting the two objects 111 and 112. $L_2$ denotes a relative distance between objects 111 and 112 within the second video frame 126, and $\theta_2$ denotes an angle of the vector from a horizontal axis of the video frame 126. The content deconstruction engine generates a relative location change vector as the differences between the polar coordinates $(L_1, \theta_1)$ and $(L_2, \theta_2)$, i.e., $(L_2-L_1, \theta_2-\theta_1)$ as shown in mapping 132 as $\vec{V_2}$. Thus, the relative motion attribute (e.g., 136f in FIG. 5A) describing the relative movement of objects 112, 113, 114 relative to object 111 can be computed in a similar manner, which is mapped to a series of velocity vectors $\vec{V_2}, \vec{V_4}, \vec{V_5} \ldots$ shown at $136f_{1-4}$.

For each attribute, the corresponding attribute value in the mapping 132 may change over time. For example, object 112 appears within frame 125 at $t_1$ but then disappears in frame 126 at $t_2$—meaning attribute values relating to object 112 are not present in the mapping at $t_2$. For another example, the relative location 217a between objects 111 and 112 changes to relative location 217b from frame 125 to frame 126. Thus, the content deconstruction engine 130 further defines each attribute value in the mapping 132 with a respective presence indicator. The presence indicator has a start time and an end time defining the time duration when the specific attribute value is present within the content segment 122a.

Figure 4:
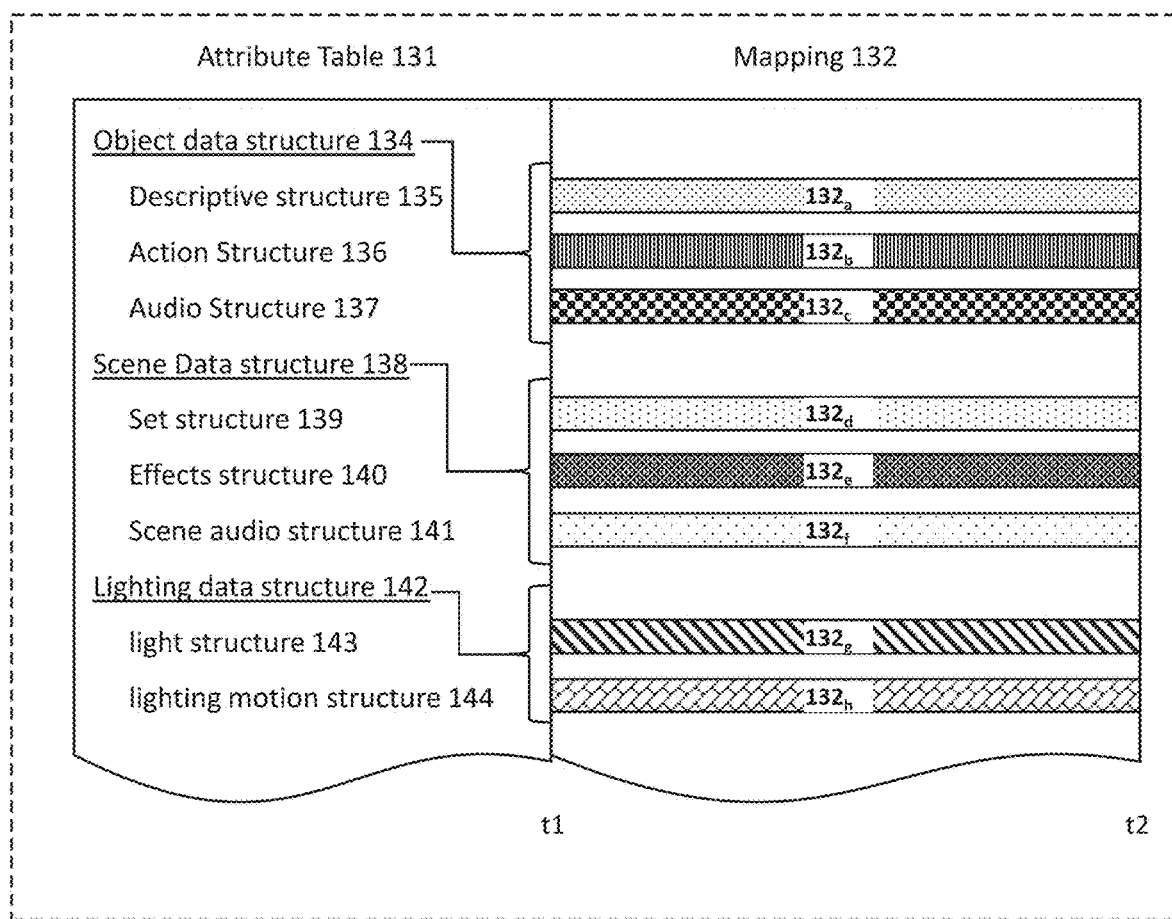
FIGS. 4-5 and 6A-D provide diagrams illustrating an example content structure including an attribute table and associated mapping generated from video frames of the content segment as shown in FIGS. 2-3, according to some embodiments described herein.

FIGS. 4-5 and 6A-D provide diagrams illustrating an example content structure 133 including an attribute table 131 and associated mapping 132 generated from video frames of the content segment 122a as shown in FIGS. 2-3, according to some embodiments described herein. Specifically, FIG. 4 shows content structure 133 includes attribute table 131 listing a number of attributes, and mapping 132 includes attribute values 132a-h corresponding to the attributes, and FIG. 5 further details attributes listed in the attribute table 131. FIGS. 6A-D provides an expanded view of mapping 132 shown in FIGS. 4-5.

Specifically, attribute table 131 may include an object data structure 134 including attributes relating to an object. The object data structure 134 includes a descriptive structure 135, an action structure 136, an audio structure 137, etc., as shown in FIG. 4. As further expanded in FIG. 5, the descriptive structure 135 lists attributes such as object name, object type (e.g., human, vehicle, architecture, animal, etc.), features 135a (e.g.,), states 135b, etc. The features 135a and states 135b may include different attributes based on the object type, e.g., age, race, gender, etc. for a human type, or model, year, make, etc. for a vehicle type, etc. The states 135b may include an emotional state (e.g., happy, sad, angry, scared, doubtful, ashamed, etc.), a motion state (e.g., laying down, sitting, sweating, shaking, swimming, flying, sailing, flailing, bleeding, waving, laughing, crying, singing, dancing, spinning, sliding, gliding, shifting, stirring, kicking, punching etc.) for a human type, or a physical state (e.g., intact, decomposed, broken, integrated, splashed, sprinkled, flowing, etc.) for a non-human type, etc.

The action structure 136 is descriptive of actions that the object is performing on or to other objects. The action structure 136 lists action name/type 136a (e.g., shooting, riding, kissing, holding, throwing, cutting, catching, etc.), object(s) that the action involves, absolute location 136b of the object with respect to the video frame, relative location 136c relative to other object(s), absolute motion 136e, relative motion 136f, etc. The location and motion attributes 136b-f are similar to those discussed in relation to FIG. 3B. The mapping 132b corresponding to the action attribute 136a may include a value indicative of a rate or a degree at which the action in taking place (e.g., running "slowly," "athletically," "quickly," etc.)

The audio structure 137 contains audio information generated by or associated with an object. For example, audio track 137a may represent dialogue spoken by the object; audio track 137b represents the sound of steps of the object running in the street; and audio 137c represents the sound of the object crashing into the front of a car. Each audio track 137a-c may further list attributes including audio type, frequency, pitch, melody, volume, lyrics, instrument, voice signature, etc.

FIG. 4 further shows the attribute table 131 includes a scene data structure 138 includes set structure 139, effects structure 140 and scene audio structure 141. As further expanded in FIG. 5, set structure 139 lists attributes of the general set for the content segment, such as setting type 139a, setting features 139b, etc. The setting type 139a may include a time period (e.g., 1930s, medieval, etc.), location (e.g., sunset blvd. in Los Angeles, etc.), or environmental (e.g., bank vault, casino, forest, desert, beach, mountain, ship, war zone, ocean floor, outer-space, etc.).

The effects structure 140 lists attributes of a special effect such as an effect type 140a (e.g., fog, smoke, flash, splash, underwater sunlight, spray, glow, spark, explosion, etc.), features 140b (e.g., color, light smoke, heavy smoke, etc.), effect area 140c (e.g., the location of the effect within the frame), and the associated object that the effect is related to.

The scene audio structure 141 lists attributes relating to various audio or sounds associated with the scene, such as a list of scene audio tracks 141a-n. Each scene audio track 141a-n further includes attributes such as audio type, pitch, frequency, melody, volume, etc. Each scene audio track 141a-n further includes an attribute indicative of allocation the audio is associated with, e.g., a siren is related to the left side of the set, a human yelling voice is related to the right side of the set, etc.

FIG. 4 further shows the attribute table 131 includes a lighting data structure 142, which includes a light structure 143 and lighting motion structure 144. As further expanded in FIG. 5, the light structure 143 includes attributes such as a light source 143a (e.g., sun, a lamp, etc.), light type 143b (e.g., natural light, lamp light, etc.), angle or azimuth 143c, color/hue 143d, saturation 143e. The lighting motion structure 144 lists attributes such as absolute location 144a of illuminated area, location 144b of illuminated area relative to the light source, absolute motion 144c of the illuminated area, motion 144d of the illuminated area relative to the light source, etc.

Figure 5:
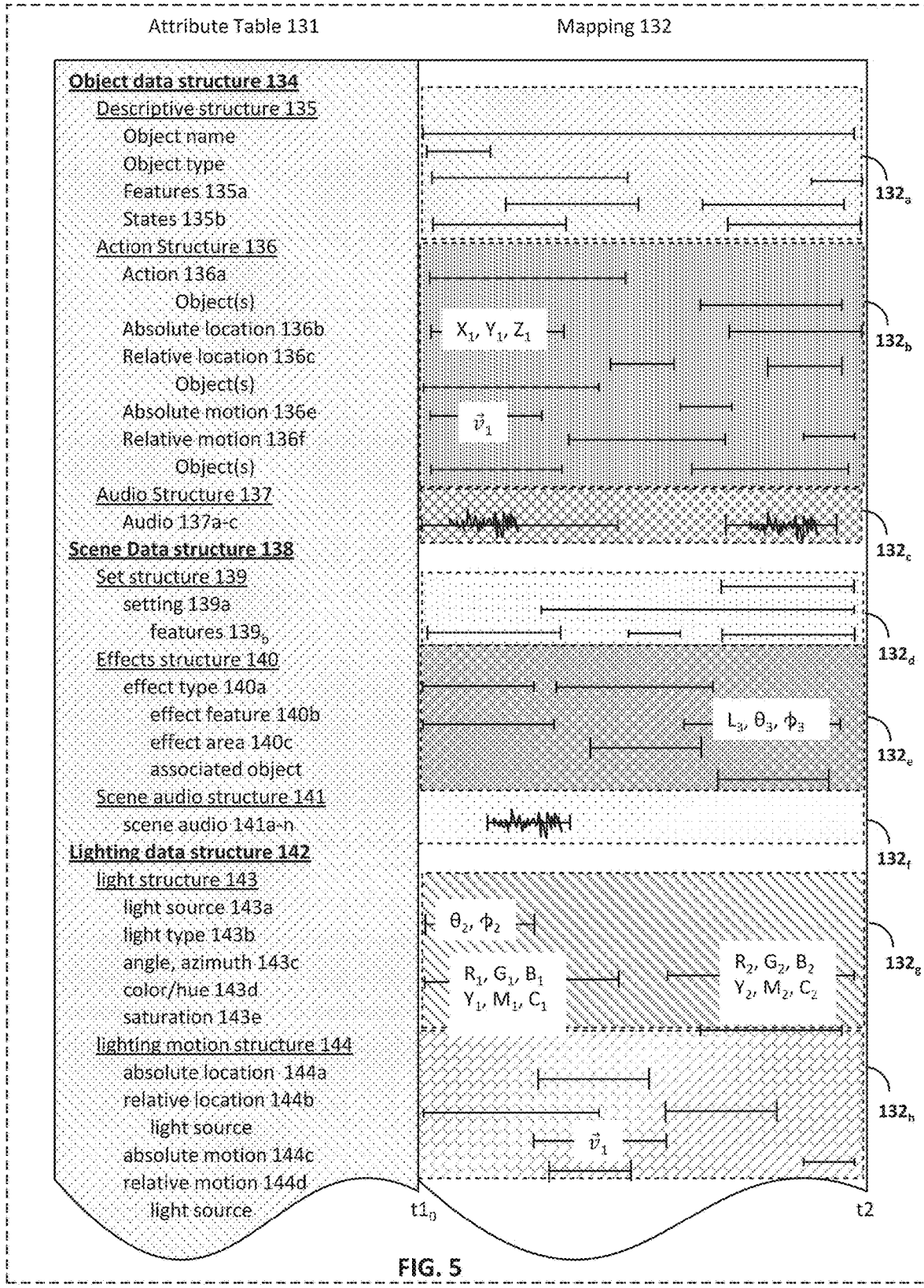
Figure 6A:
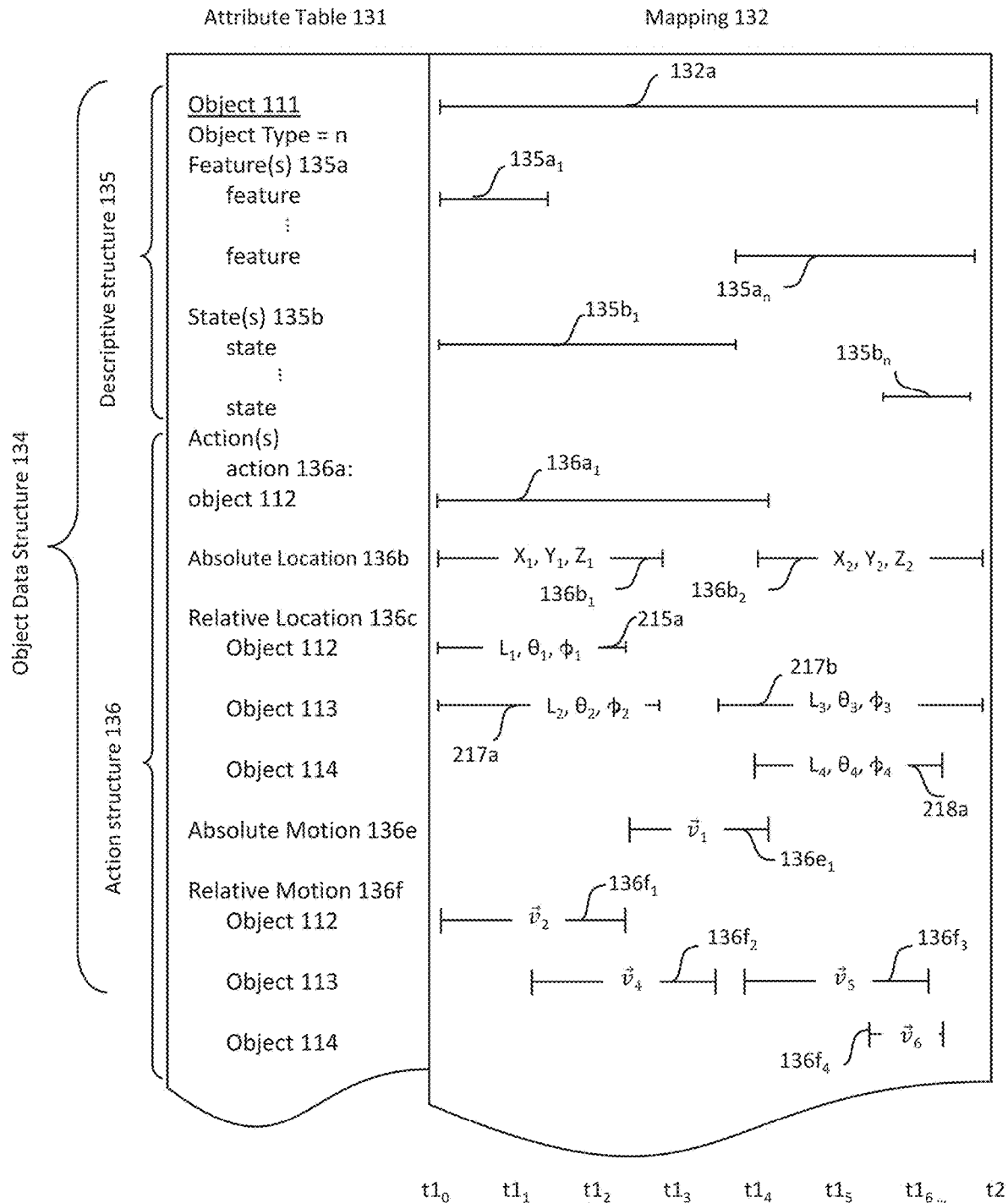
Figure 6B:
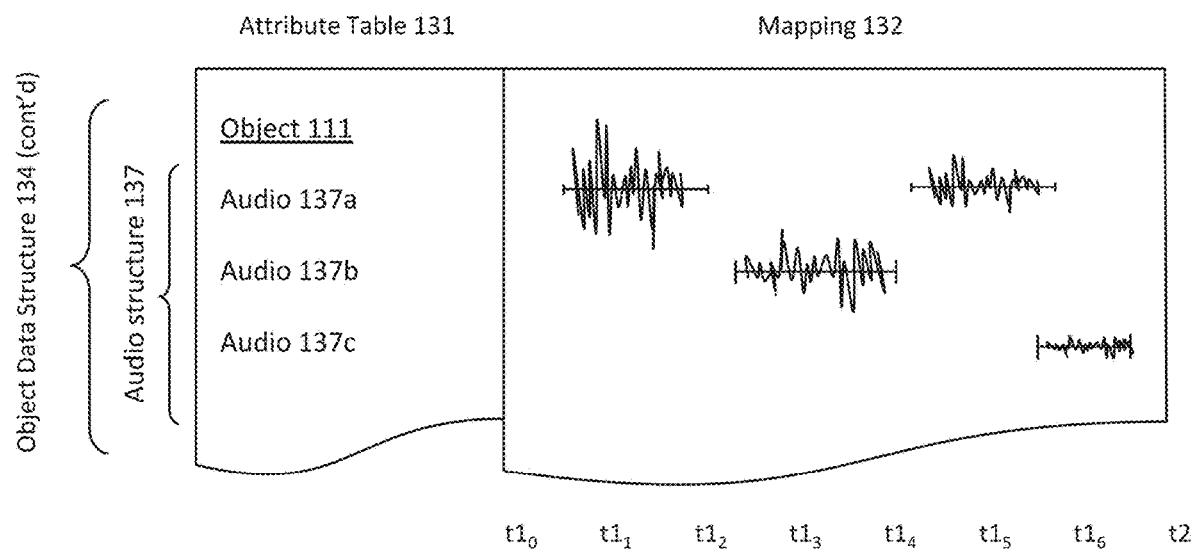
Figure 6C:
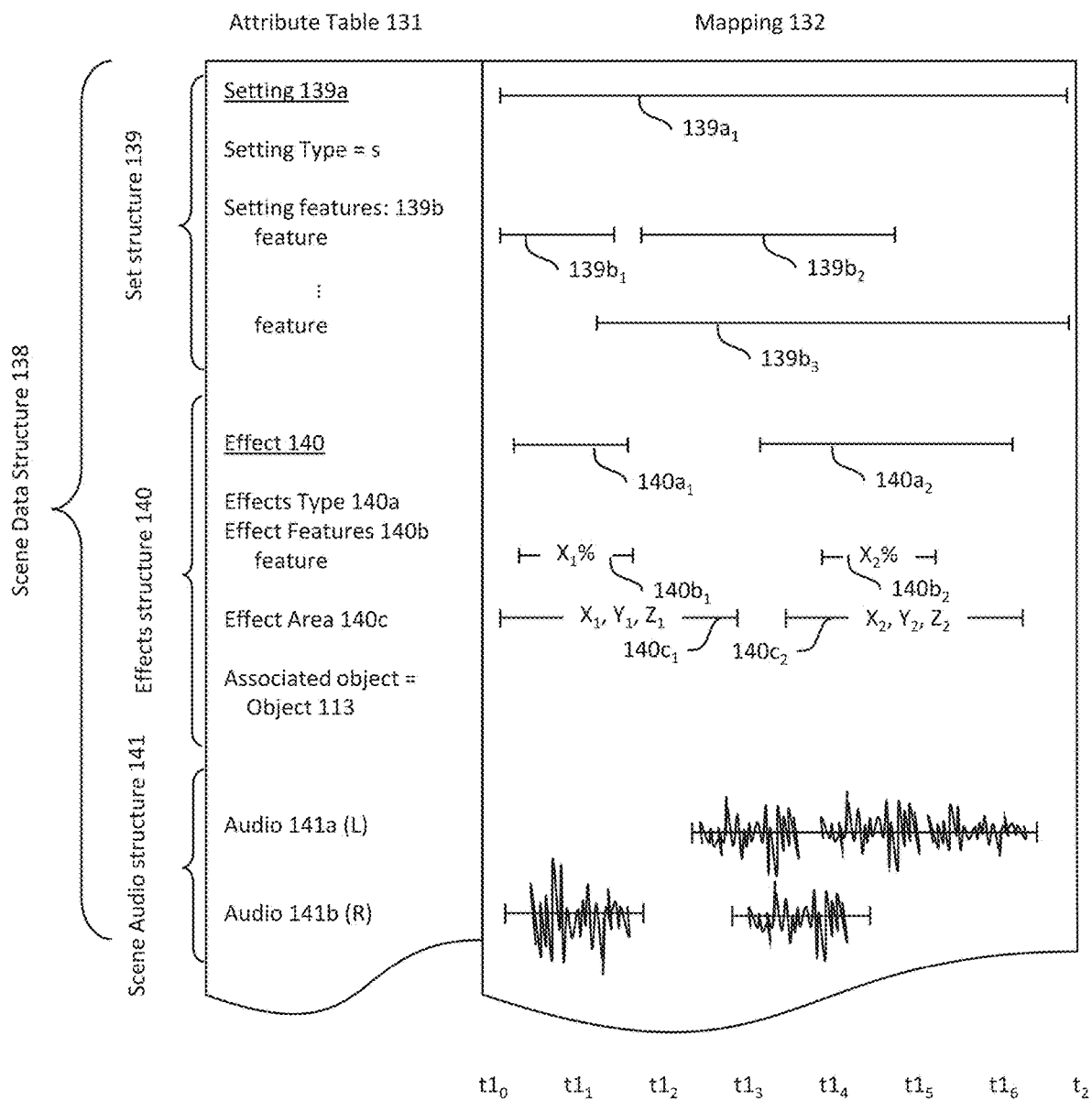
Figure 6D:
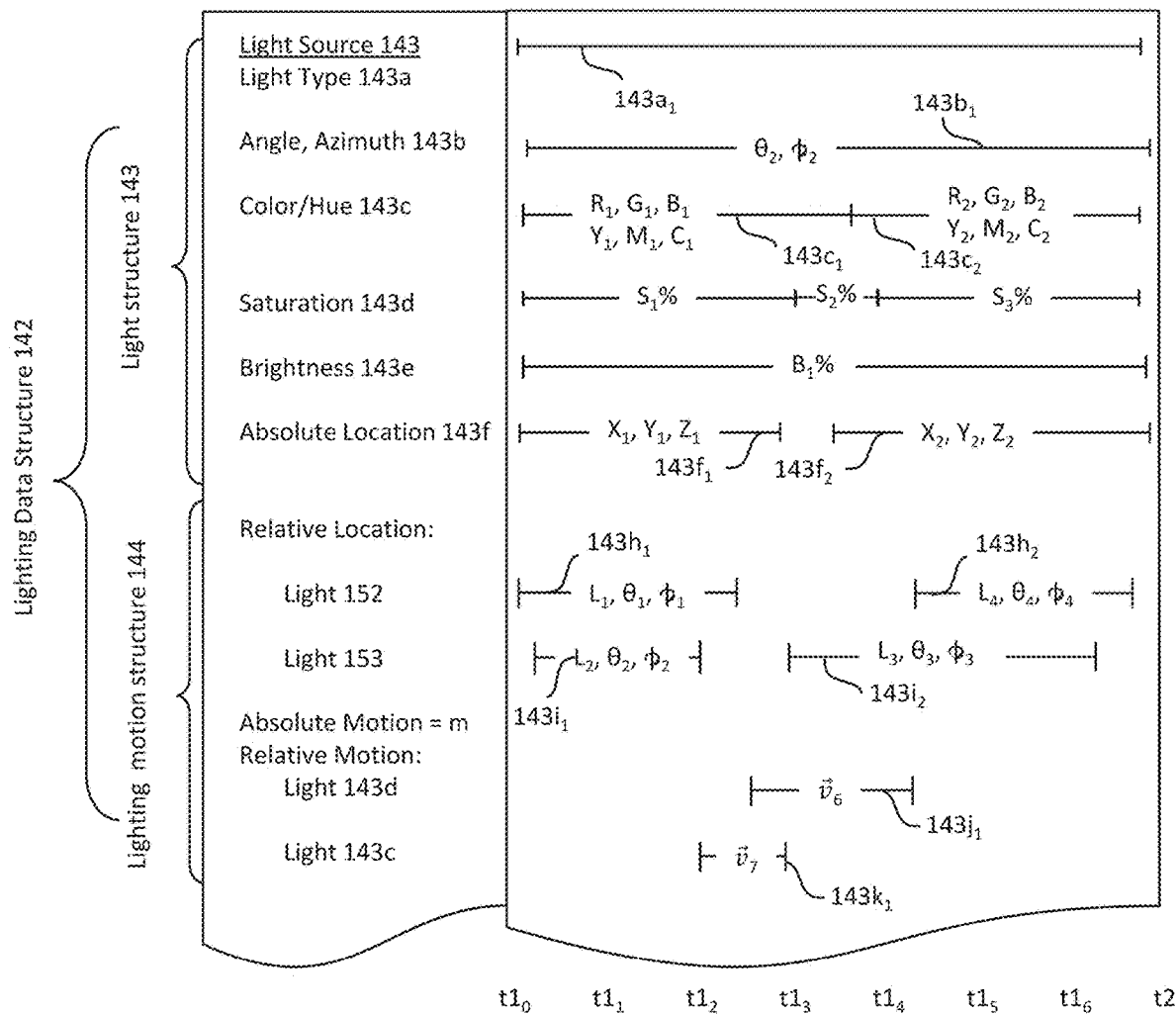

FIGS. 4-5 further show mappings 132a-h include attribute values corresponding to the attributes in the attribute table 131. The attribute values may take different data formats, e.g., a numeric value, a percentage, a descriptor, etc. For example, at mapping 132a, the attribute value corresponding to object type can be "human," "vehicle," "animal," etc. At mapping 132b, the attribute value corresponding to absolute location attribute 136b is the coordinates $(X_1, Y_1, Z_1)$. At mapping 132g, the attribute value corresponding to color 143d can be the red, green and blue parameters (of the lighting). Each attribute value is bounded by a time duration defined by the presence indicator, as illustrated by the various line segments shown at mappings 132a-h.

FIGS. 6A-D provide an expanded view of content structure 133 shown in FIGS. 4-5. Specifically, the duration of the content segment 122a between $t_1$ and $t_2$ is divided into smaller time units such as $t1_0, t1_1, t1_2, \ldots t1_n, \ldots t2$. Every mapping corresponding to a specific attribute value is then associated with the presence indicator that has a start time and an end time chosen from $t1_0, t1_1, t1_2, \ldots t1_n, \ldots t2$.

For example, feature mappings (e.g., "Caucasian," "male," "28 years old," "brown hair," "red shirt," etc.) $135a_{1-n}$ may be bounded by the time duration when object 111 appears in content segment 122a. State mappings (e.g., "angry," "tense," "running," "jumping," etc.) $135b_{1-n}$ may each be bounded by the time when the actual state appears, e.g., state="running" between $t1_0$ and $t1_x$, and then changes to "jumping" between $t1_x$ and $t1_y$.

Similarly, mapping 132 further shows action mapping $136a_1$, absolute location mappings $136b_{1-2}$, relative location mappings 215a, 217a, 217b and 218a, absolute motion mapping $136e_1$, relative motion mapping $136f_{1-4}$ (as also discussed in relation to FIG. 3B), setting mappings $139a_1$, setting feature mappings $139f_{1-3}$, effects type mappings $140a_{1-2}$, effects feature mappings $140b_{1-2}$, effect area mappings $140c_{1-2}$, light type mapping $143a_{1-2}$, angle mapping $143b_1$, color mapping $143c_{1-2}$, saturation mapping, absolute location mappings $143f_{1-2}$, relative location mappings $143h_{1-2}$ and $143i_{1-2}$, absolute motion of light mapping $143j_1$, relative motion of light mapping $143k_1$, etc. Each mapping is represented by a line segment indicative of the time duration that the specific mapping is present in content segment 122a.

Figure 7:
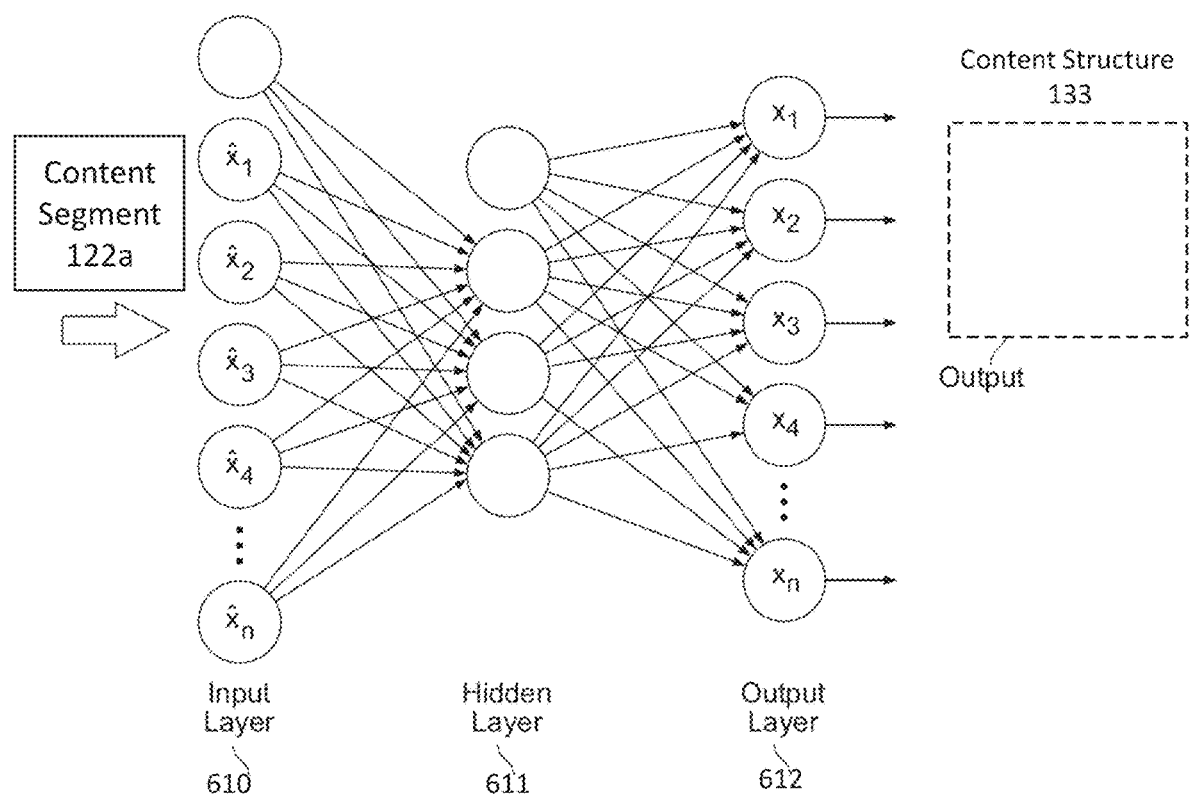
FIG. 7 provides an example diagram illustrating the process of training and generating content structure via an artificial neural network, according to some embodiments described herein.
Figure 8:
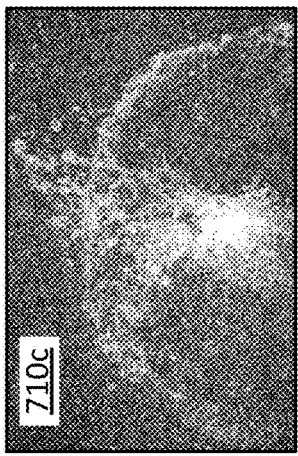
FIG. 8 provides example training sets for object/scene/effect identification for the artificial neural network illustrated in FIG. 7.
Figure 8:
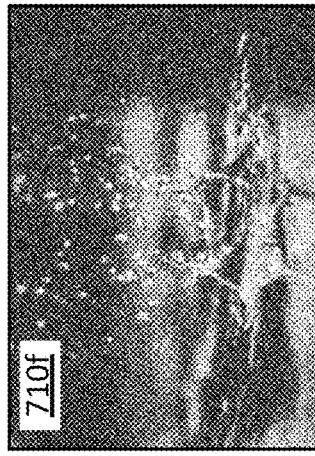
Figure 8:
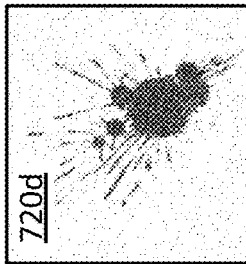
Figure 8:
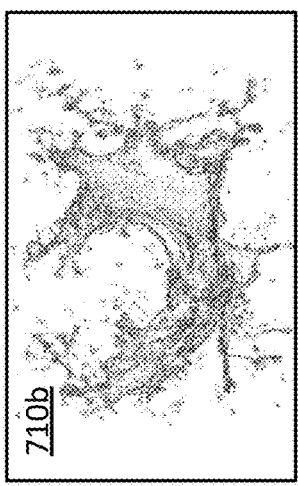
Figure 8:
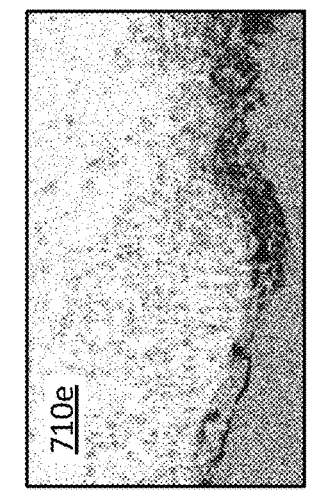
Figure 8:
Figure 8:
Figure 8:
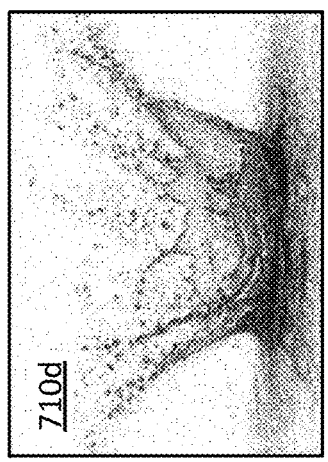
Figure 8:
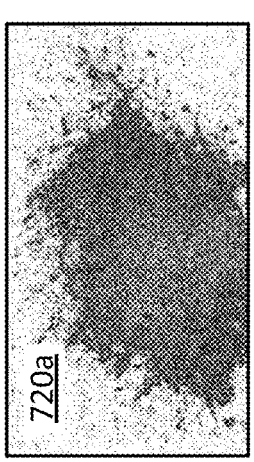

FIG. 7 provides an example diagram illustrating the process of training and generating content structure 133 via an artificial neural network, according to some embodiments described herein. An artificial neural network may be trained to recognize objects, scenes, audios, settings, effects, etc., from a content segment. Content segment 122a can then be fed to the input layer 610 of the artificial neural network. For example, various visual representations may indicate the same type of object, scene, etc. As shown in FIG. 8, the effect "water splash" 710a-f or "blood splatter" 720a-d may share a common pattern, but each has different visualization. The artificial neural network may be trained to identify the common pattern from different visualizations via processing at one or more hidden layers 611. Thus, by identifying objects, scenes, audios, settings, effects, etc., from the content segment, an output of the content structure 133 is generated at the output layer 612. Further details relating to identifying objects from a content segment are provided in co-pending and commonly assigned U.S. nonprovisional application Ser. No. 16/216,275, filed on Dec. 11, 2018, which is hereby expressly incorporated by reference herein in its entirety.

FIG. 8 provides example training sets for object/scene/effect identification for the artificial neural network illustrated in FIG. 6. For example, a number of images, videos, etc. 710*a-f* showing different kinds of "water splash" can be used to train the artificial neural network to identify the effect of "water splash" 710 from a content segment. For another example, a number of images, videos, etc. 720*a-d* showing different kinds of "blood splatter" can be used to train the artificial neural network to identify the effect of "blood splatter" 720 from a content segment.

FIGS. 9A-B provide pseudo-code examples of content structure 133 illustrated in FIGS. 4-5 and 6A-D, according to some embodiments described herein. Content structure 133 may be stored in a structured data format compatible with XML, JSON, Python, etc. For example, FIG. 9A shows an example segment of attribute table 131 that lists a hierarchical structure of data fields for the attribute table 131, under which object data structure 134 is listed, under which the description structure 135 is listed, under which an object 111 is listed, under which a number of features of the object 111 are listed, and so on.

FIG. 9B shows an example segment of mapping 132. For example, mapping 132 specifies the object identifier for object 111, and the presence indicator of a time duration "0:00-00:11" during which object 111 is present within the content segment 122*a*. Mapping 132 also specifies a mapping for the object state attribute, e.g., [0,00:00-00:02, 27] indicates a state of code "0" (e.g., referring to the state of "determined) having a degree of "27" (e.g., 27 out of 100, referring to "moderately determined") during the time duration "00:00-00:02." The state mapping may change to [1, 00:02-00:05, 35], which indicates a state of code "1" (e.g., referring to the state of "intense") having a degree of "35" (e.g., 35 out of 100 level of "intense") during time duration "00:02-00:05," and so on.

In another example, mapping 132 includes mappings for the absolute or relative locations, the absolute or relative motions of object 111, as discussed in relation to FIGS. 3A-B. As shown in FIG. 9B, the absolute location mapping [00:00-00:02, (11.34, 23.34, 23.87)] indicates the location at the 3-D coordinates (11.34, 23.34, 23.87) during time "00:00-00:02." The absolute location mapping may change to [00:02-00:07, (12.02, 21.23, 05.67)], indicating the location of object 111 changes to the location at coordinates (12.02, 21.23, 05.67) during time "00:02-00:07," and so on. The relative location mapping [112, 00:00-00:02, (2.7, 30°)] indicates a relative location at polar coordinates (2.7, 30°) relative to object 112 during the time "00:00-00:02," and so on. The absolute motion mapping [00:00-00:02, ($\vec{v}1$)] indicates a motion vector $\vec{v}1$ during the time "00:00-00:02," and so on. The relative motion mapping [112, 00:00-00:02, ($\vec{v}4$)] indicates a relative motion vector $\vec{v}4$ relative to object 112 during the time "00:00-00:02," and so on.

Another content structure 133 taking a form similar to XML is provided below:

```
<content_structure>
<attribute table>
<object>
   <object_id> 111 </object_id>
   <type> human </type>
     <feature>
        <gender> male </gender>
        <age> 28 </age>
        <height> 6' </height>
        <hair_color> brown hair </hair_color>
        <race> Caucasian </race>
        <attire> check shirt </attire>
        ...
     </feature>
     <state>
        <emotion> determined, intense </emotion>
        ...
     </state>
        ...
</attribute_table>
<object_map>
   <object_map_ID> map 132 </object_map_ID>
<start_time>00:00 </start_time>
<end_time> 00:10 </end_time>
   <object_ID> object 111 </object_ID>
<location>
     <absolute location>
        <x_coordinate> 12344.34 </x_coordinate>
        <y_coordinate> 4234.45 </y_coordinate>
     </absolute location>
     <relative_location>
        <relative_object_id> 112 </relative_object_id>
        <relative_distance> 12 </relative_distance>
        <relative_angle> 23° </relative_angle>
        ...
     </relative_location>
<start_time>00:10 </start_time>
<end_time> 00:15 </end_time>
     <absolute location>
        <x_coordinate> 16342.56 </x_coordinate>
        <y_coordinate> 3234.48 </y_coordinate>
     </absolute location>
     <relative_location>
        <relative_object_id> 112 </relative_object_id>
        <relative_distance> 90 </relative_distance>
        <relative_angle> 47° </relative_angle>
        ...
     </relative_location>
     ...
   </location>
   <motion>
     <start_time>00:00 </start_time>
     <end_time> 00:10 </end_time>
   <velocity> 10mph,53°,260° </velocity>
   <relative motion>
      <relative_object_id> 112 </relative_object_id> <velocity> 1 mph,5°, 2°
   </velocity>
   </relative motion>
     ...
   </motion>
<audio>
<start_time>00:00 </start_time>
<end_time> 00:10 </end_time>
   <audio_object_ID> audio_111 </audio_object_ID)
      <dialogue> "Come on" </dialogue>
      <background_audio> instrumental </background_audio>
      ...
   </audio>
   ...
</object_map>
<object> ... </object>
...
</content_structure>
```

For another example, for a physical object such as a car, attributes in the object data structure may be hierarchical, including object, object type, object sub-type, object name, make and model, color, etc., and the corresponding mapping may include "non-human object," "vehicle," "automobile," "car," "BMW," "SUV X5," "red," and/or the like.

Figure 10:
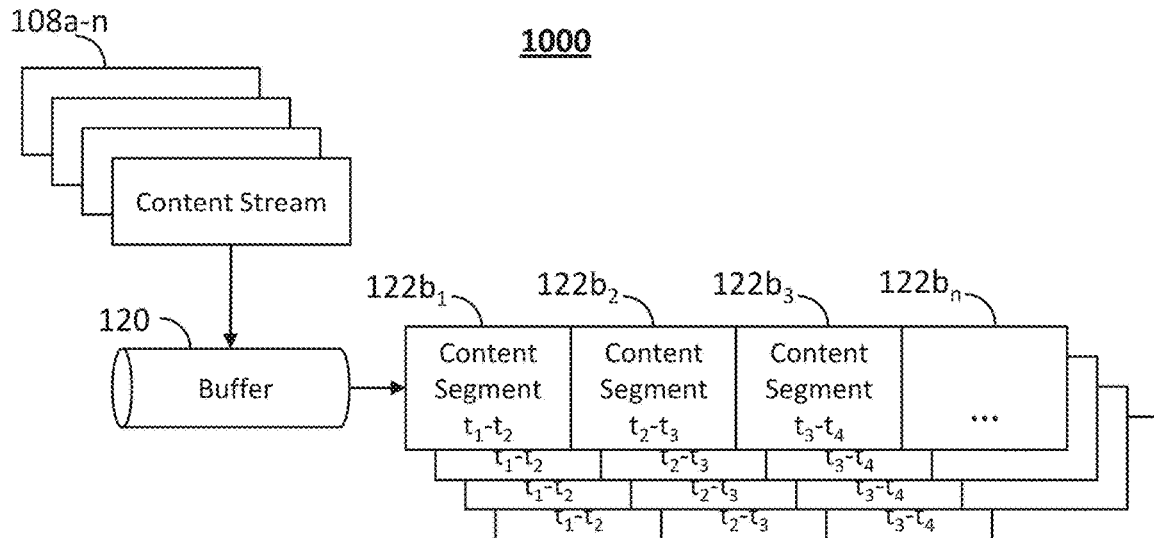
FIGS. 10-11 provide example diagrams illustrating the content deconstruction engine processing a number of content streams to generate a number of content structures, according to some embodiments described herein.
Figure 11:
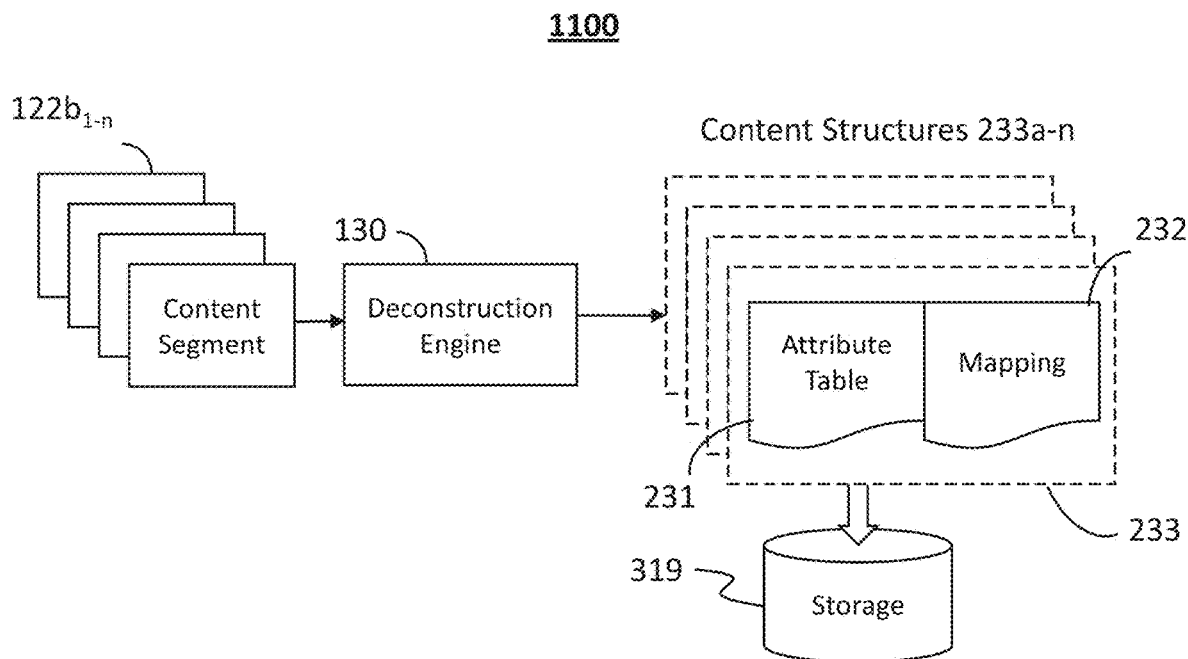

FIGS. 10-11 provide example diagrams illustrating the content deconstruction engine 130 processing a number of content streams 108a-n to generate a number of content structures, according to some embodiments described herein. For example, FIG. 10 shows a pre-processing system 1000 that is similar to the pre-processing system 100 in FIG. 1, but a number of content streams 108a-n are fed to the buffer 120, e.g., in a parallel input structure. Each content stream 108a-n is then deconstructed into a respective number of content segments. Depending on the content stream, different content streams may be deconstructed into content segments in different manners. For example, content stream 108a may be deconstructed into content segments $108a_{1-n}$, each having a defined length (e.g., 10 ms, etc.), while content stream 108b may be deconstructed into content segments $122b_{1-n}$ by identifying the change of scenes in content stream 108b.

The deconstructed content segments $122a_{1-n}$, $122b_{1-n}$, . . . are then fed to the content deconstruction engine 130 as shown in diagram 1100 in FIG. 11. The content deconstruction engine 130 may deconstruct each content segment $122a_{1-n}$, $122b_{1-n}$ . . . into a content structure 233a-n for storage at 319. For example, each content structure 233 would be similar to content structure 133 discussed throughout 1-9, e.g., including an attribute table 231 and the mapping 232.

The content structures 233a-n may be generated in a distributive manner at distributed processors, in parallel by parallel processors, or in any other processing orders. The content structures 233a-n may be stored in database 319 either together collectively, or may be stored separately at distributed servers for later retrieval to construct new content.

Figure 12:
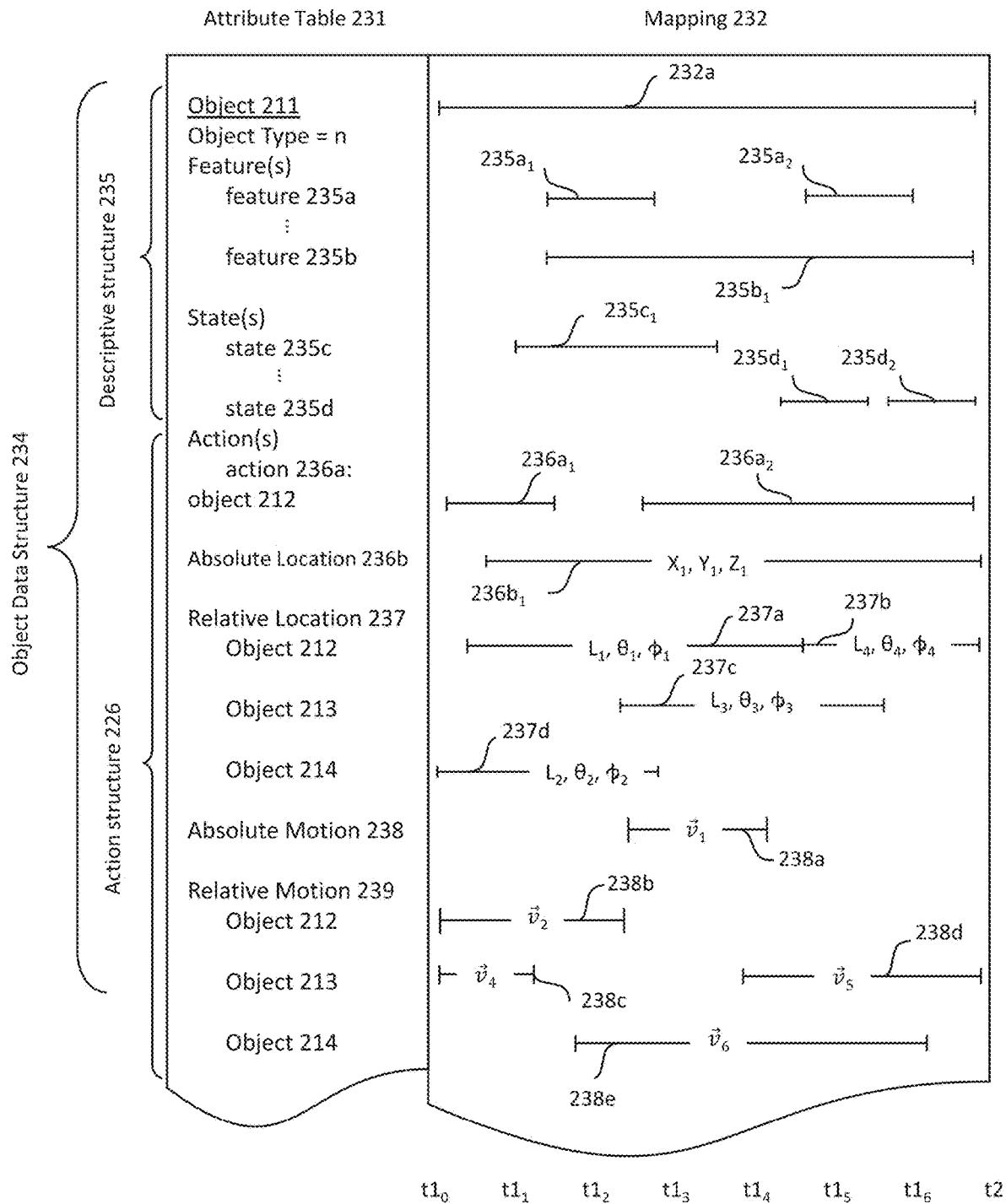
FIG. 12 shows another example of content structure in a similar format as those shown in FIGS. 4-5 and 6A-D.

FIG. 12 shows another example of content structure 233 having the attribute table 231 and mapping 232. Content structure 233 may take a form similar to content structure 133 as shown in FIGS. 4-5 and 6A-D, having the attribute table 231 and mapping 232. The attribute table 231 lists object data structure 234 including the action structure 226 and descriptive structure 235, each including a number of attributes such as object features 235a-b, states 235c-d, action absolute location 236b, relative location 237, absolute motion 238, relative motion 239, etc. The mapping 232 is illustrated by various line segments, indicating each mapping is bounded by a time duration during which the corresponding attribute value indicated by the respective mapping is present within the content segment. Attribute mappings 232a, $235a_{1-n}$, $235b_1$, $235c_1$, $235d_{1-2}$, $236a_{1-2}$, $236b_1$, 237a-d, 238a-e shown at mapping 232 may be defined in a similar manner as discussed in relation to mapping 132 of FIGS. 6A-D.

Figure 13A:
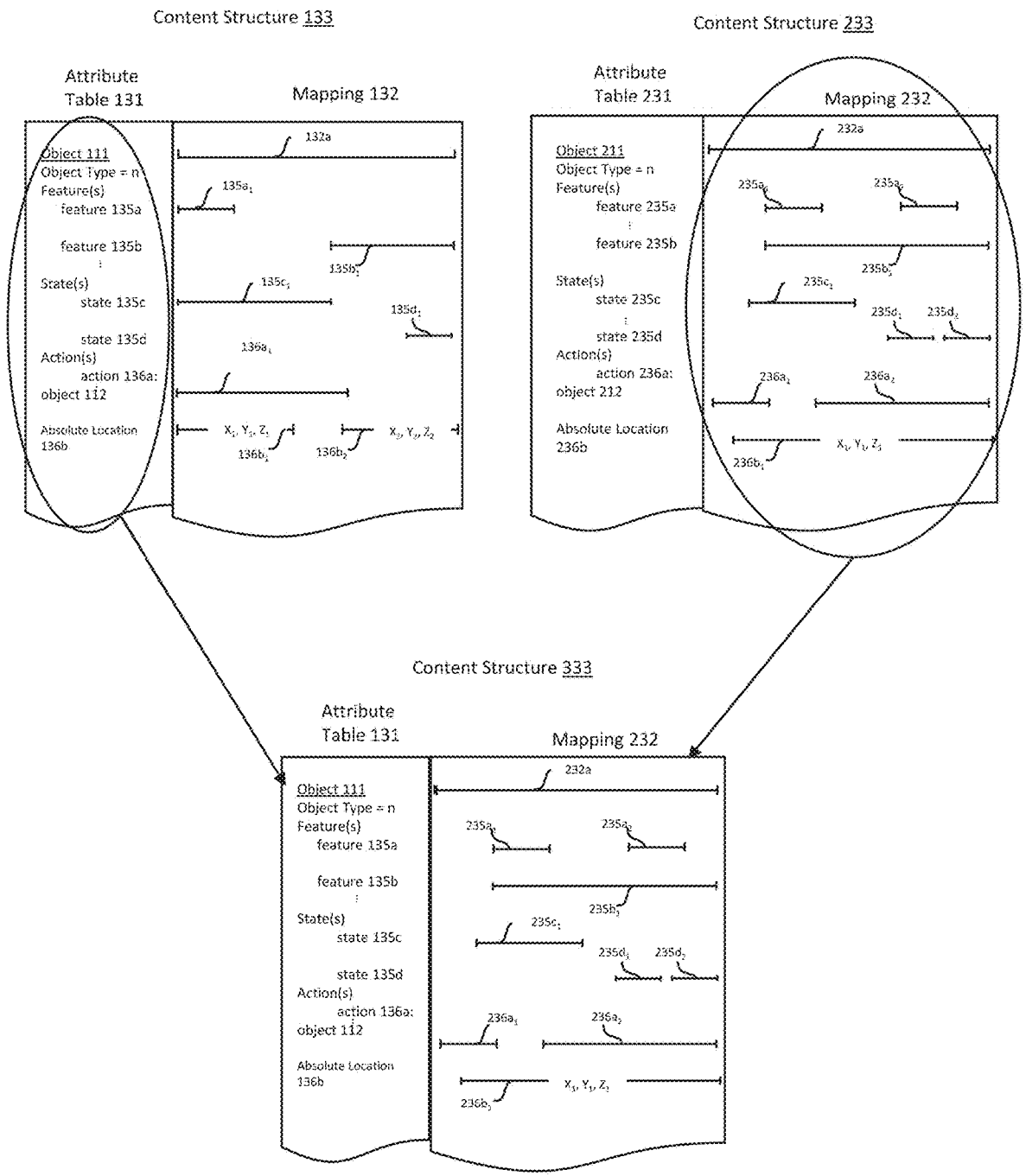
FIGS. 13A-15 provide example diagrams illustrating aspects of creating new content from previously created and stored content structures discussed throughout FIGS. 1-12.
Figure 13B:
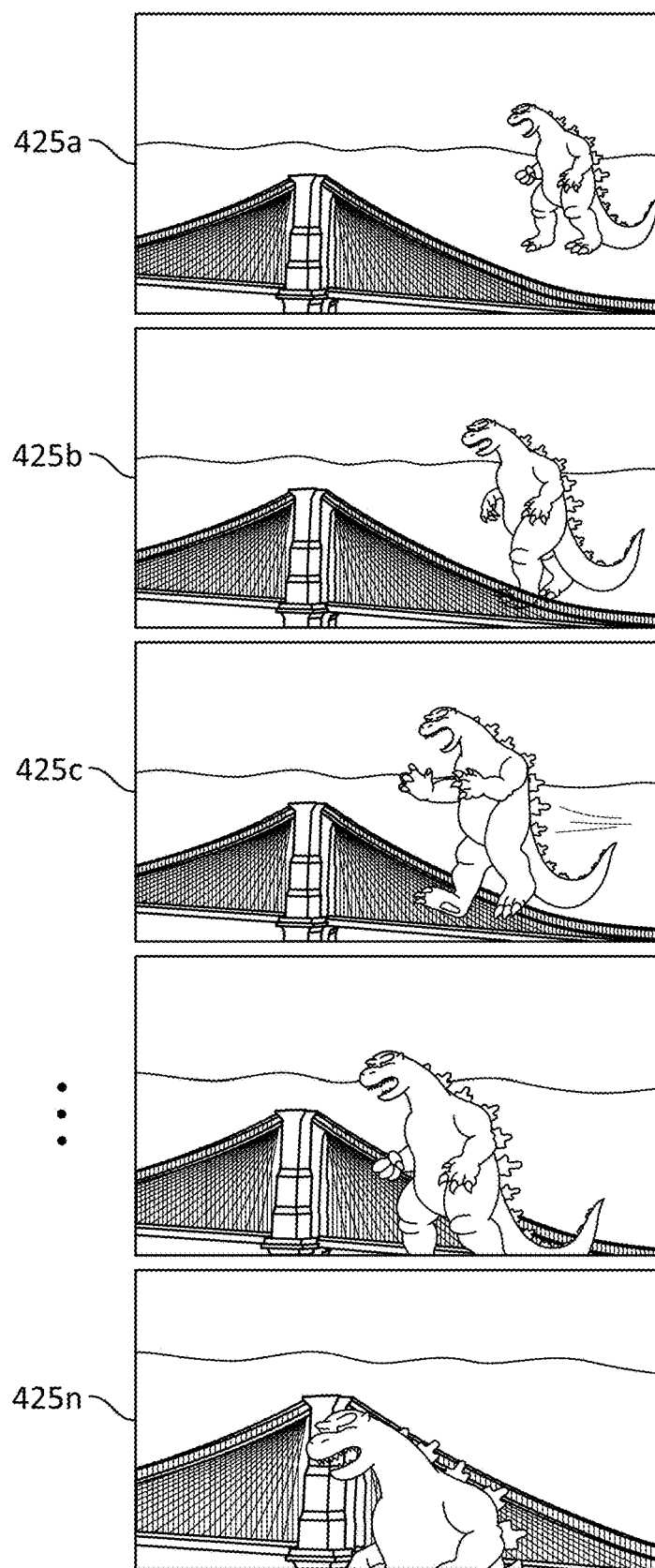
Figure 14:
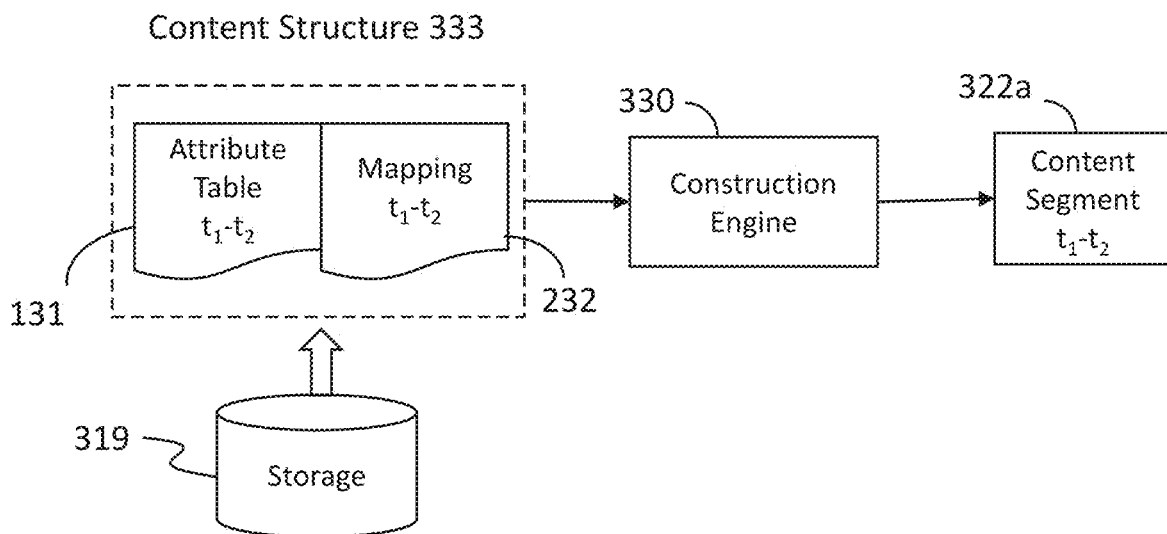

FIGS. 13A-14 provide example diagrams illustrating aspects of creating new content from previously created and stored content structures discussed throughout FIGS. 1-12. Specifically, FIG. 13A shows generating a new content structure 333 based on previously created and stored content structures 133 shown in FIGS. 4-5 and content structure 233 shown in FIG. 11. For example, the mapping 132 in content structure 133 may be modified or replaced by mapping 232 from content structure 233.

In this way, attributes of the object data structure for object 111 are assigned new attribute values from mapping 232, which can change the appearance, state, movement, etc., of the original object 111 to result in a new object. For example, in content structure 133, object feature attributes in attribute table 131, such as race, age, gender, height, skin tone, hair color, eye color, etc., are mapped to attribute values in mapping 132 such as "Caucasian," "28 years old," "male," "6 feet," "tanned," "brown hair," "hazel eyes," etc. In content structure 233, object feature attributes in attribute table 231, such as species, age, gender, height, skin tone, hair color, eye color, etc., are mapped to "undefined creature," "mature," "male," "56 feet," "lizard green," "no hair," "black eyes," etc. By mix-matching mapping 232 with attribute table 131, the new content structure 333 has the object data structure for object 111 being mapped to attribute values "undefined creature," "mature," "male," "56 feet," "lizard green," "no hair," "black eyes," etc.

As shown in FIG. 13A, attributes such as actions, absolute locations, etc., in the attribute table 131 are assigned to relevant attribute values from mapping 232. For example, the action is changed from "(running, upright on two limbs)" to "(lumbering, on two limbs and tail)." The absolute location can be changed to a set of new coordinates that fit the size and shape of the monster creature. The motion can be changed to the motion vectors indicative of the speed and motion pattern of the monster creature. Thus, in the new content structure 333, the original object 111, which is indicative of a Caucasian male character running and jumping (e.g., as shown in FIG. 3A), is modified to indicate a monster creature that has lizard skin lumbering heavily.

Similarly, another object structure (e.g., indicative of the red car shown in video frames 125a-n in FIG. 3A) in content structure 133 can be mapped to attribute values depicting a bridge-tower architecture, which may be obtained from another content structure (e.g., different from 133 or 233). The setting mappings corresponding to setting attributes in attribute table 131 can be replaced by setting mappings from another different, previously stored content structure (e.g., different from content structures 133 or 233). For example, the setting mappings in mappings 132, which are indicative of "Sunset Blvd, Los Angeles," can be changed to "Brooklyn bridge, New York." The lighting mappings corresponding to lighting attributes in attribute table 131 can be replaced by lighting mappings from yet another previously stored content structure, e.g., to change the lighting mapping from daylight to a night pattern, and so on. The new content structure 333 is then indicative of a monster creature that has lizard skin lumbering heavily on the Brooklyn Bridge and crashing into the bridge tower (e.g., as illustrated in video frames 425a-n in FIG. 13B).

Thus, by mix-matching a number of previously stored content structures, new content structure 333 is created, which can be used to reconstruct new content showing a monster creature crashing into the Brooklyn Bridge in New York. The content generation process requires little production cost without expensive setting, filming or computer editing that is usually required for content creation of the science fiction genre.

The new content structure 333 shown in FIG. 13A may be generated by user selection. For example, the content construction engine 330 may provide a drag-and-drop feature in a user interface such that a user can drag the new mapping 232 into the content structure 133 to replace mapping 132 via the user interface. Or a user may program and edit the content structure 133, e.g., by editing attribute values in mapping 132, etc. Alternatively, in another implementation, a content construction engine may be implemented to automatically combining, replacing or mix-matching a previously stored content structure upon indication of an object, scene, effect, etc., to be replaced. In the respective example in FIG. 13A, a user may select the object 211 (e.g., the "monster" object) described by content structure 233 via a user interface to indicate that the object 111 (e.g., the "male" object) is to be replaced. The content construction engine 330 may then populate the attributes corresponding to object 111 in attribute table 131 with attribute values corresponding to object 211 from mapping 132, as illustrated in FIG. 13A.

In some embodiments, the content construction engine may automatically determine which mappings from mapping 232 of the content structure 233 can be used to customize object 111 in content structure 133. For example, the content construction engine determines a list of attributes for object 111 that need to be populated or customized, e.g., attributes depicting the physical appearance and movement patterns. The content construction engine may then obtain attribute values from the customized mapping 232 that depict the physical appearance and movement patterns of a monster creature to populate attributes relating to object 111 in content structure 133.

FIG. 14 provides an example block diagram illustrating constructing a new content segment based on the new content structure 333 shown in FIG. 13A, according to embodiments described herein. Content construction system 1400 shows a content construction engine 330, which may be implemented together with, or separately from, the content deconstruction engine 130, which retrieves the new content structure 333 from storage device 319, and then converts the content structure 333 into content segment 322a. The conversion may be done by computer rendering algorithms to render video frames 425a-n as shown in FIG. 13B based on structured data from the new content structure 333. The video frames 425a-n are then combined sequentially and consecutively to output content segment 322a.

Figure 15:
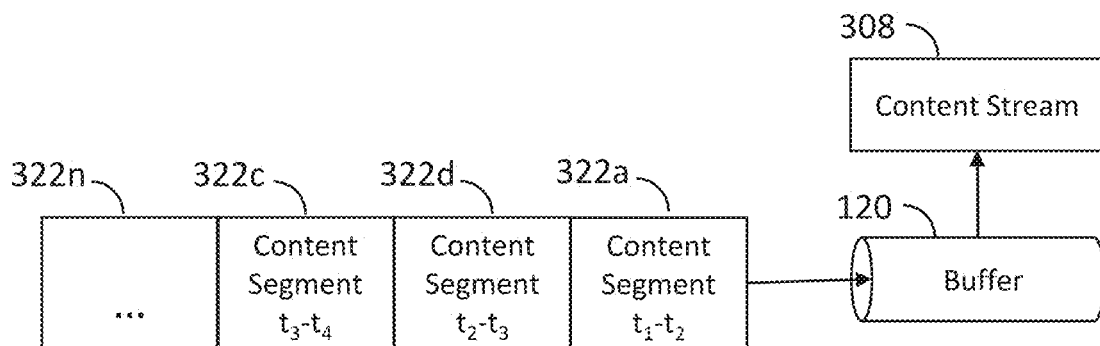

FIG. 15 provides an example block diagram 1500 illustrating constructing a new content stream based on various new content segments as generated in FIG. 14, according to embodiments described herein. New content segments 322a-n may be generated in parallel, in sequence or at distributed processors of the content construction engine 330 and stored at buffer 120. The buffered content segments 322a-n at the buffer 120 may be concatenated in a time-sequential manner to form a new content stream 308.

The content deconstruction engine 130 and/or the content construction engine 330 described throughout FIGS. 1-15 may be implemented using any suitable architecture. For example, the content deconstruction engine and/or the content construction engine may be a stand-alone application wholly implemented on a computer device. In such an approach, instructions of the content deconstruction engine and/or the content construction engine are stored locally (e.g., in storage 319 in FIG. 2), and data for use by the engine may also be stored locally and/or downloaded on a periodic basis (e.g., from an out-of-band feed, from an Internet resource, or using another suitable approach). Control circuitry may be used to retrieve instructions of the content deconstruction engine and/or the content construction engine from storage and process the instructions to generate any of the content structures discussed herein. Based on the processed instructions, control circuitry may determine what action to perform when input is received.

In some embodiments, the content deconstruction engine and/or the content construction engine is a client server-based application. Data for use by a thick or thin client implemented on a computer device is retrieved on-demand by issuing requests to a server remote to the computer device. In one example of a client server-based content deconstruction engine and/or content construction engine, control circuitry processes instructions provided by a remote server. For example, the remote server may store the instructions for the application in a storage device.

In some embodiments, the content deconstruction engine and/or the content construction engine is downloaded and interpreted or otherwise run by an interpreter or virtual machine (run by control circuitry). In some embodiments, the content deconstruction engine and/or the content construction engine may be encoded in the ETV Binary Interchange Format (EBIF), received by control circuitry as part of a suitable feed, and interpreted by a user agent running on control circuitry. For example, the content deconstruction engine and/or the content construction engine may include an EBIF application. In some embodiments, the content deconstruction engine and/or the content construction engine may be defined by a series of JAVA-based or JSON based files that are received and run by a local virtual machine or other suitable middleware executed. In some of such embodiments (e.g., those employing MPEG-2 or other digital media encoding schemes), the content deconstruction engine and/or the content construction engine may be, for example, encoded and transmitted in an MPEG-2 object carousel with the MPEG audio and video packets of a program.

It is contemplated that the actions or descriptions of each of FIGS. 1-15 may be used with any other embodiment of this disclosure. In addition, the actions and descriptions described in relation to FIGS. 1-15 may be done in alternative orders or in parallel to further the purposes of this disclosure.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry. The processing circuitry, for instance, may be a general-purpose processor, a customized integrated circuit (e.g., an ASIC), or a field-programmable gate array (FPGA) within the content construction engine or the content deconstruction engine described through the disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for creating new content based on deconstructed content, the method comprising:
receiving a first content portion that depicts a first object;
deconstructing the first content portion into a plurality of attributes and a plurality of attribute values associated with the first object;
generating a mapping that comprises the plurality of attribute values corresponding to the plurality of attributes;
generating a first content structure comprising the plurality of attributes and the mapping;
accessing a data structure comprising at least a second attribute associated with a second object, wherein the second attribute corresponds to a second attribute value;
retrieving, from the data structure, the second attribute and the second attribute value;
generating a second content structure by selectively replacing (i) a first attribute of the plurality of attributes with the second attribute and (ii) a first attribute value of the plurality of attribute values with the second attribute value in the first content structure; and
constructing, based on the second content structure, a second content portion to depict the first object with the second attribute and the second attribute value.

2. The method of claim 1, wherein deconstructing the first content portion comprises:
determining, based on using pattern recognition on the first content portion, a plurality of objects depicted in the first content portion; and
for each object of the plurality of objects:
determining, based on the depiction in the first content portion, attributes and associated attribute values; and
storing the attributes and the attribute values in an attribute table associated with the each object.

3. The method of claim 1, wherein generating the mapping comprises:
mapping an attribute value to a sub-portion within the content portion during which the first object is depicted with the attribute having the attribute value; and
storing an indicator for the sub-portion in association with the first object.

4. The method of claim 1, wherein selectively replacing the first attribute with the second attribute and the first attribute value with the second attribute value is in response to receiving an indication to replace the first attribute with the second attribute.

5. The method of claim 1, wherein creating the second content structure comprises adjusting a time frame associated with the second attribute value to match a time frame associated with the first attribute value.

6. The method of claim 5, wherein the content portion is extracted based on at least one of a predetermined duration, a portion definition indicator, a pause in audio, and closed caption data.

7. The method of claim 1, wherein the plurality of attributes comprises a list of object attributes that includes at least one of a descriptive structure, an action structure, and an audio structure.

8. The method of claim 1, wherein receiving the content portion comprises:
receiving a content stream comprising the content portion; and
extracting the content portion.

9. The method of claim 1, wherein the content portion comprises a sequence of video frames, and wherein the method further comprises:
identifying an object in the content portion that appears in each video frame of the sequence of video frames;
tracking, for the identified object, a changing attribute in the sequence, wherein tracking the changing attribute comprises determining, for the changing attribute of the identified object, attribute values corresponding to each video frame of the sequence; and
wherein the mapping comprises the changing attribute mapped to the sequence based on the determined attribute values.

10. The method of claim 9, wherein the changing attribute is a position of the identified object in the sequence of video frames, and wherein the position is a relative position between the identified object and a second object in the sequence.

11. A system for creating new content based on deconstructed content, the system comprising:
communications circuitry configured to receive a first content portion, wherein the first content portion depicts a first object; and
control circuitry configured to:
deconstruct the first content portion into a plurality of attributes and a plurality of attribute values associated with the first object;
generate a mapping that comprises the plurality of attribute values corresponding to the plurality of attributes;
generate a first content structure comprising the plurality of attributes and the mapping;
access a data structure comprising at least a second attribute associated with a second object, wherein the second attribute corresponds to a second attribute value;
retrieve, from the data structure, the second attribute and the second attribute value;
generate a second content structure by selectively replacing (i) a first attribute of the plurality of attributes with the second attribute and (ii) a first attribute value of the plurality of attribute values with the second attribute value in the first content structure; and
construct, based on the second content structure, a second content portion to depict the first object with the second attribute and the second attribute value.

12. The system of claim 11, wherein the control circuitry, when deconstructing the first content portion, is configured to:
determine, based on using pattern recognition on the first content portion, a plurality of objects depicted in the first content portion; and
for each object of the plurality of objects:
determine, based on the depiction in the first content portion, attributes and associated attribute values; and
store the attributes and the attribute values in an attribute table associated with the each object.

13. The system of claim 11, wherein the control circuitry, when generating the mapping, is configured to:
map an attribute value to a sub-portion within the content portion during which the first object is depicted with the attribute having the attribute value; and store an indicator for the sub-portion in association with the first object.

14. The system of claim 11, wherein the control circuitry is configured to selectively replace the first attribute with the second attribute and the first attribute value with the second attribute value in response to receiving an indication to replace the first attribute with the second attribute.

15. The system of claim 11, wherein the control circuitry, when creating the second content structure, is configured to adjust a time frame associated with the second attribute value to match a time frame associated with the first attribute value.

16. The system of claim 11, wherein the plurality of attributes comprises a list of object attributes that includes at least one of a descriptive structure, an action structure, and an audio structure.

17. The system of claim 11, wherein:
the communication circuitry is further configured to receive a content stream comprising the content portion; and
the control circuitry is configured to extract the content portion.

18. The system of claim 17, wherein the control circuitry is configured to extract the content portion based on at least one of a predetermined duration, a portion definition indicator, a pause in audio, and closed caption data.

19. The system of claim 11, wherein the content portion comprises a sequence of video frames, and wherein the control circuitry is further configured to:
identify an object in the content portion that appears in each video frame of the sequence of video frames;
track, for the identified object, a changing attribute in the sequence, wherein the control circuitry is configured to track the changing attribute by determining, for the changing attribute of the identified object, attribute values corresponding to each video frame of the sequence; and
wherein the mapping comprises the changing attribute mapped to the sequence based on the determined attribute values.

20. The system of claim 19, wherein the changing attribute is a position of the identified object in the sequence of video frames, and wherein the position is a relative position between the identified object and a second object in the sequence.

* * * * *